I. MERRILL.
Hook Attachments to Bands of Fire-Arms.
No. 137,786. Patented April 15, 1873.
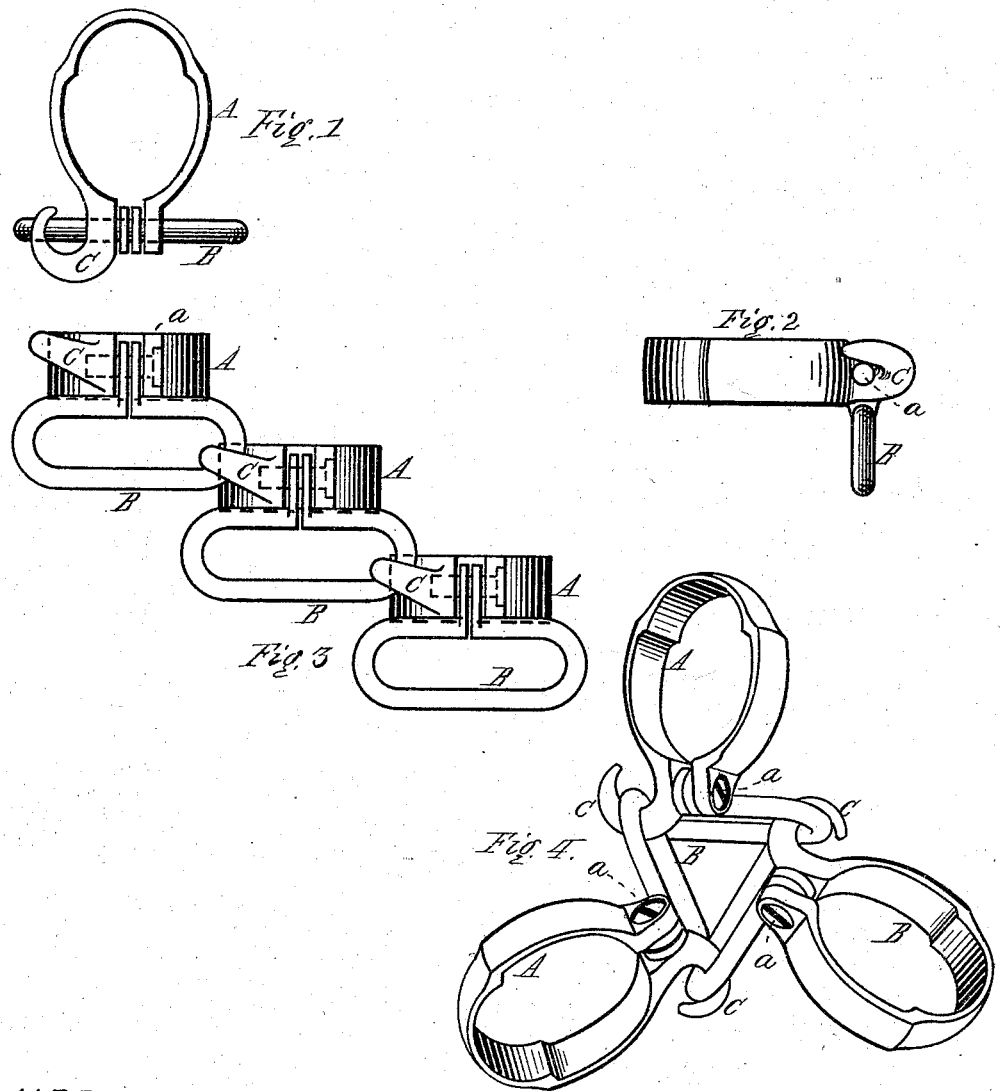

UNITED STATES PATENT OFFICE.

IRA MERRILL, OF SPRINGFIELD, MASSACHUSETTS.

IMPROVEMENT IN HOOK ATTACHMENTS TO BANDS OF FIRE-ARMS.

Specification forming part of Letters Patent No. 137,786, dated April 15, 1873; application filed December 24, 1872.

*To all whom it may concern:*

Be it known that I, IRA MERRILL, of Springfield, in the county of Hampden and State of Massachusetts, have invented a new and useful Improvement in Fire-Arms; and I do hereby declare that the following is a full, clear, and exact description thereof, reference being had to the accompanying drawing making a part of this specification, and to the letters of reference marked thereon, in which—

Figure 1 is a plan view of my invention as applied to the band of a gun-barrel. Fig. 2 is a side view of the same. Fig. 3 is a rear view of the same, and showing also the manner of securing the hooks in the rings or swivels, in the operation of stacking three guns together, to form the tripod for a larger number; and Fig. 4 shows the swivels and hooks as secured together to form the tripod.

My invention relates to a device to be attached to guns, which, in connection with a ring or swivel upon the gun, is designed to be used to connect the guns substantially to form a tripod against which other guns are to be stacked; and it consists of a hook, made preferably as a part of the band, placed within convenient distance upon the barrel from the muzzle, and with the end of the hook slightly inclined toward the muzzle, so as to permit the stocks of the guns forming the tripod to stand apart properly.

That others skilled in the art may be able to make and use my invention, I will proceed to describe its construction and operation.

In the drawing, A represents the band which secures the stock to the barrel near the muzzle, and this band is made in the usual manner and with the common swivel attached, except that one end of the band, when the swivel is secured, is elongated and bent in the form of a hook, as shown in Fig. 1, and the end of the hook is slightly inclined upward, as shown in Figs. 3 and 4.

This hook may be made separate from the band, and attached to it by the usual swivel-screw inserted; or it may be a part of and solid with the band, as shown in the drawing, which is preferable as saving expense in the manufacture.

In the operation of stacking arms, three guns are first secured together by placing the hook of one into the swivel of the next gun, in position shown in Fig. 3. After two have been attached together, their butts are placed apart, and the third is then attached, and the unattached hook is brought around and hooked into the unoccupied swivel, and the butts of the guns spread in the form of a triangle. This operation brings the bands with the hooks and swivels into the position shown in Fig. 4, in which position, if the bands were in place upon the guns the latter would form a tripod against which to rest other guns in the operation of stacking.

This device is intended to take the place of the ordinary bayonet in securing the first three guns together in stacking, and would be equally operative if the hook were made to screw into the stock at the proper distance from the muzzle of the gun; or the hook might be made upon one end of the ordinary swivel, and by such manufacture the swivel might have more freedom to swing upon the pivot in the band. This, however, might be a questionable advantage, and I prefer to make the hook upon the band, as shown in the drawing.

In guns having no stock extending beneath the barrel, both the hook and the ring or swivel may be attached to the barrel itself by soldering, brazing, or in any other convenient manner.

With this device guns may be stacked easily and and quickly, and without the necessity of first fixing the bayonet, as is now ordinarily done, as no bayonet is required; and any kind of bayonet may be used without interfering in the least with the operation of stacking arms.

Having thus described my invention, what I claim as new, and desire to secure by Letters Patent, is—

The combination of the hook C with a ring or swivel attached to the gun, substantially as and for the purpose herein set forth.

IRA MERRILL.

Witnesses:
T. A. CURTIS,
C. E. BUCKLAND.